(12) United States Patent
Wei et al.

(10) Patent No.: US 9,361,040 B1
(45) Date of Patent: Jun. 7, 2016

(54) SYSTEMS AND METHODS FOR DATA STORAGE MANAGEMENT

(71) Applicant: Marvell International Ltd., Hamilton (BM)

(72) Inventors: Tao Wei, Shanghai (CN); Jacky Feng, Shanghai (CN); Ke Wei, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 155 days.

(21) Appl. No.: 14/186,587

(22) Filed: Feb. 21, 2014

Related U.S. Application Data

(60) Provisional application No. 61/770,041, filed on Feb. 27, 2013.

(51) Int. Cl.
*G06F 3/06* (2006.01)
(52) U.S. Cl.
CPC .............. *G06F 3/065* (2013.01); *G06F 3/0604* (2013.01); *G06F 3/064* (2013.01); *G06F 3/0683* (2013.01)
(58) Field of Classification Search
None
See application file for complete search history.

(56) References Cited

U.S. PATENT DOCUMENTS

| | | | |
|---|---|---|---|
| 2007/0033330 A1* | 2/2007 | Sinclair | G06F 3/0605 711/103 |
| 2010/0106919 A1* | 4/2010 | Manning | G06F 11/1666 711/154 |
| 2011/0078496 A1* | 3/2011 | Jeddeloh | G06F 3/0616 714/6.24 |
| 2011/0252187 A1* | 10/2011 | Segal | G06F 12/0246 711/103 |
| 2012/0303878 A1* | 11/2012 | Haas | G06F 12/0246 711/103 |
| 2013/0282955 A1* | 10/2013 | Parker | G06F 12/0246 711/103 |

* cited by examiner

*Primary Examiner* — Elias Mamo

(57) ABSTRACT

System and methods are provided for data storage management in a memory device. A first logical block corresponding to a plurality of first physical blocks of a memory device is selected. A source physical block within the first physical blocks is determined, the source physical block including less valid data than one or more second physical blocks within the first physical blocks. A target physical block of the memory device is obtained. The valid data in the source physical block is copied to the target physical block. The source physical block is released for storing new data.

13 Claims, 7 Drawing Sheets

SYSTEMS AND METHODS FOR DATA STORAGE MANAGEMENT

CROSS-REFERENCE TO RELATED APPLICATIONS

This disclosure claims priority to and benefit from U.S. Provisional Patent Application No. 61/770,041, filed on Feb. 27, 2013, the entirety of which is incorporated herein by reference.

FIELD

The technology described in this patent document relates generally to data storage and more particularly to data storage management in storage media.

BACKGROUND

Flash memory is widely used in storage systems because flash memory devices often do not have the mechanical delays associated with hard drives, thereby allowing higher performance in addition to lower cost and less power consumption. A NAND flash memory is usually organized into multiple physical blocks, with each physical block including multiple pages (e.g., 16 pages, 64 pages, 128 pages, etc.). NAND flash memory is often managed using logical blocks that are mapped to the physical blocks, e.g., by a logical-to-physical table. For example, a particular logical block may be mapped to one or more physical blocks.

When new data is to be written to a logical block, the corresponding physical blocks are accessed for the writing operation. Usually, the new data cannot be written to a page if that page has some current data. An erasure operation often needs to be performed on the entire physical block to which the particular page belongs to make that page available for new data.

Oftentimes, a previously used physical block may need to be reclaimed for use (i.e., garbage collection). One or more pages in the physical block may include some old data that is replaced by new data which is stored elsewhere. Such pages are no longer accessible because they are no longer linked with any logical block (e.g., in the logical-to-physical table), and thus the data in these pages becomes invalid. On the other hand, the physical block still has other pages containing valid data and these pages are linked with one or more logical blocks (e.g., referenced by the logical-to-physical table). The garbage collection process may operate by copying the valid data in the physical block to a new physical block and releasing the physical block accordingly, which results in the reclaiming of the entire physical block for storing new data.

FIG. 1 depicts an example diagram for garbage collection. As shown in FIG. 1, valid data in three physical blocks 102, 104 and 106 that are allocated to a logical block 108 are copied to a new physical block 110 for garbage collection. Specifically, the physical blocks 102, 104 and 106 each include valid data and invalid data. The valid data in the physical blocks 102, 104 and 106 is copied to the physical block 110. The physical block 110 is allocated to the logical block 108, and the physical blocks 102, 104 and 106 are released for storing new data.

SUMMARY

In accordance with the teachings described herein, system and methods are provided for data storage management in a memory device. A first logical block corresponding to a plurality of first physical blocks of a memory device is selected. A source physical block within the first physical blocks is determined, the source physical block including less valid data than one or more second physical blocks within the first physical blocks. A target physical block of the memory device is obtained. The valid data in the source physical block is copied to the target physical block. The source physical block is released for storing new data.

In one embodiment, a memory device includes a memory array organized into multiple original physical blocks for storing data, and a memory controller. The memory controller is configured to: select a first logical block corresponding to a plurality of first physical blocks, the first logical block being included in the original logical blocks, the plurality of first physical blocks being included in the original physical blocks; determine a source physical block within the first physical blocks, the source physical block including less valid data than one or more second physical blocks within the first physical blocks; obtain a target physical block; copy the valid data in the source physical block to the target physical block; and release the source physical block for storing new data.

In another embodiment, a system for data storage management in a memory device includes one or more data processors and a computer-readable memory encoded with programming instructions for commanding the one or more data processors to perform certain operations. A first logical block corresponding to a plurality of first physical blocks of a memory device is selected. A source physical block within the first physical blocks is determined, the source physical block including less valid data than one or more second physical blocks within the first physical blocks. A target physical block of the memory device is obtained. The valid data in the source physical block is copied to the target physical block. The source physical block is released for storing new data.

BRIEF DESCRIPTION OF THE DRAWINGS

FIG. 3(A)-FIG. 5(B) depict example diagrams for passive garbage collection under different circumstances.

DETAILED DESCRIPTION

Figure 1:
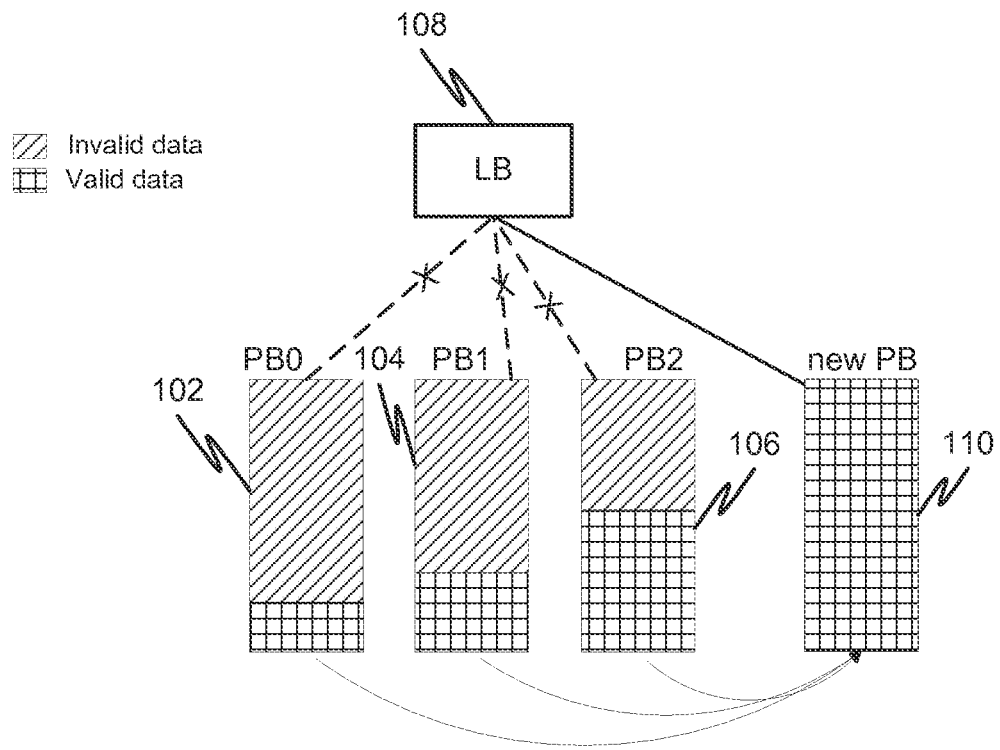
FIG. 1 depicts an example diagram for garbage collection.

Referring back to FIG. 1, garbage collection is performed by copying all valid data in the physical blocks 102, 104 and 106 to the new physical block 110. However, the physical blocks 102, 104 and 106 may each have a large volume of valid data, and thus the garbage collection process may result in a long wait time which negatively affects the performance of the memory device.

Figure 2:
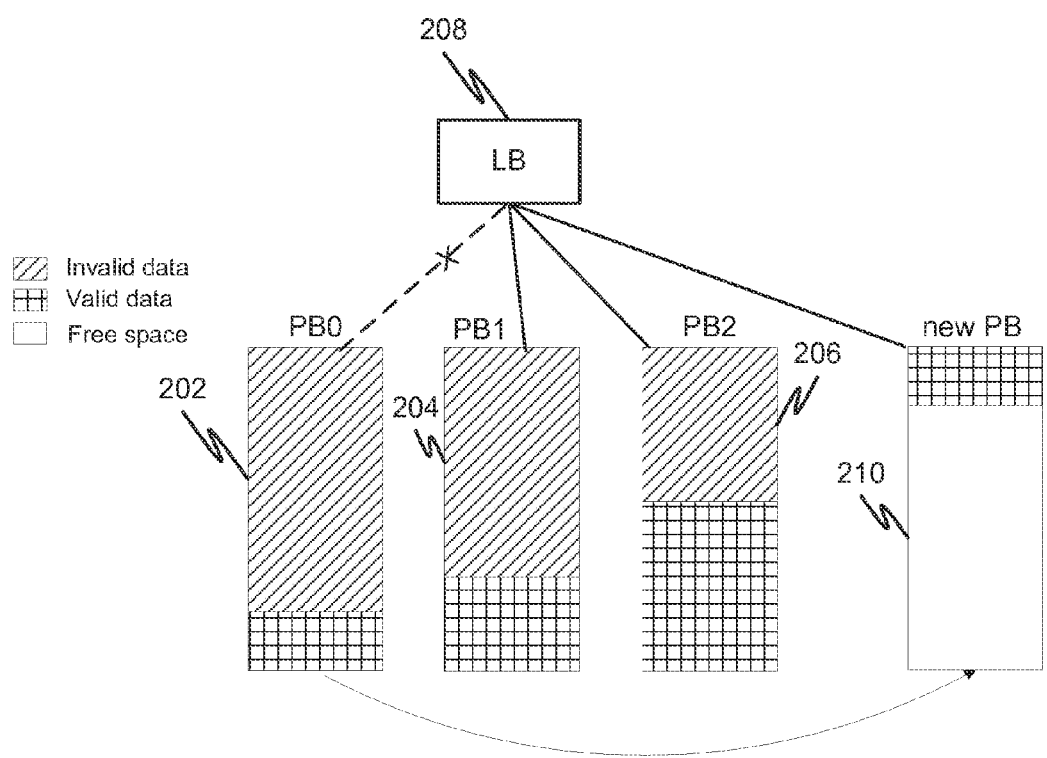
FIG. 2 depicts an example diagram for active garbage collection.

The present disclosure describes two garbage collection schemes, i.e., active garbage collection and passive garbage collection, for different circumstances in a memory device (e.g., a flash memory device). FIG. 2 depicts an example diagram for active garbage collection. As shown in FIG. 2, three physical blocks 202, 204 and 206 that are allocated to a logical block 208 are fully written. When new data is to be written to the logical block 208, the physical block 202 that includes the least amount of valid data among the physical blocks 202, 204 and 206 is selected for garbage collection.

The valid data in the physical block 202 is copied to a new physical block 210 that includes free space (e.g., pages without any data). The new data can be written to the physical block 210 subsequently.

Specifically, the physical blocks 202, 204 and 206 are fully written with valid data and invalid data. The physical block 202 includes less valid data than the physical blocks 204 and 206, and is thus selected for garbage collection to reduce the wait time caused by the garbage collection process. The valid data in the physical block 202 is copied to the new physical block 210, and thereafter the physical block 210 still has plenty of free space (e.g., pages without data). The physical block 202 is released from the logical block 208, while the physical block 210 is allocated with the logical block 208. For example, a logical-to-physical table is updated accordingly to reflect the mapping changes of the logical block 208. As an example, the physical block 210 is obtained from another logical block, or obtained as a free physical block that is not linked to any logical block.

In some embodiments, N physical blocks (e.g., N is an integer not equal to 3), are allocated to a logical block. If all physical blocks are fully written and new data is to be written to the logical block, active garbage collection operations similar to what are described above can be performed. In certain embodiments, when two or more physical blocks have a same volume of valid data which is less than that of other physical blocks, one of these two or more physical blocks may be selected for garbage collection based on a random selection or a certain rule (e.g., according to sequence numbers).

Figure 3:
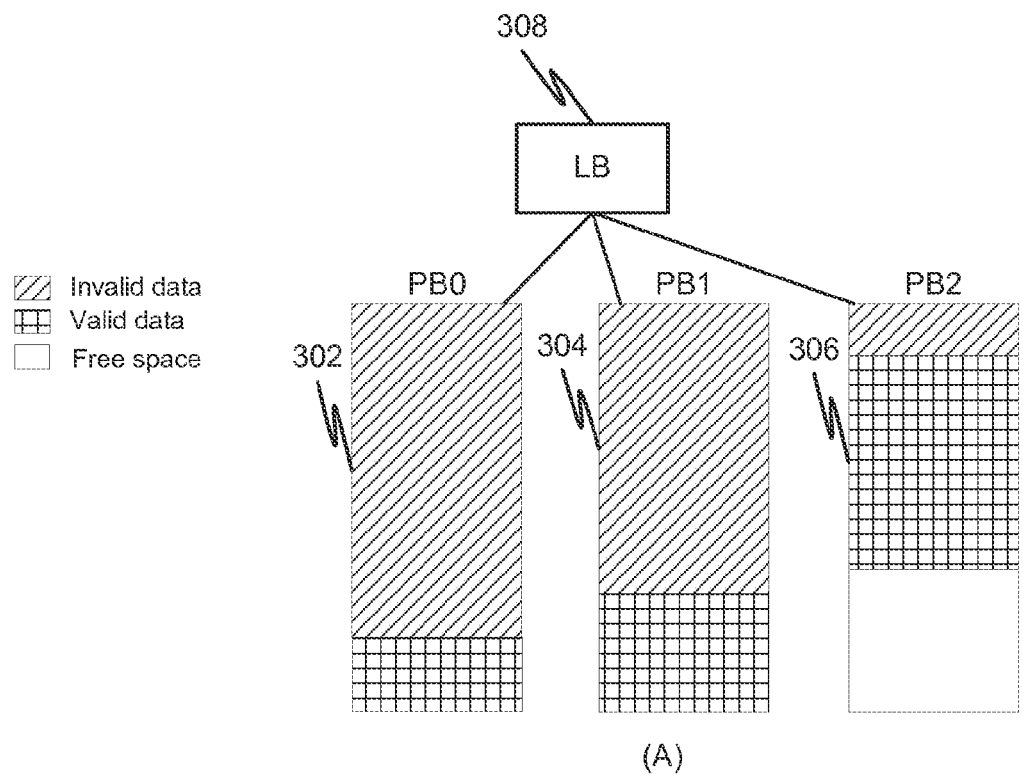
Figure 3:
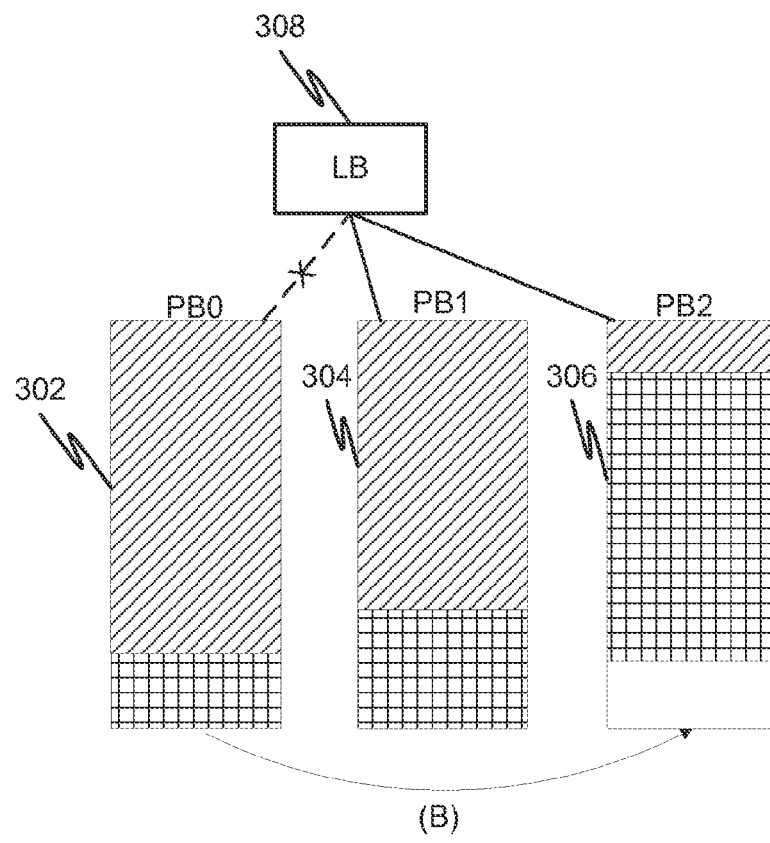

FIG. 3(A)-FIG. 5(B) depict example diagrams for passive garbage collection under different circumstances. One or more physical blocks of a logical block are released so that these physical blocks can be allocated to other logical blocks. As shown in FIG. 3(A), three physical blocks 302, 304 and 306 are allocated to a logical block 308 and each include valid data and invalid data. The physical block 302 includes less valid data than the physical blocks 304 and 306. The physical block 306 includes free space (e.g., pages without data) that is sufficient to store the valid data in the physical block 302. As shown in FIG. 3(B), the valid data in the physical block 302 is copied to the free space in the physical block 306. Then, the physical block 302 is released and may be allocated to another logic block.

Figure 4:
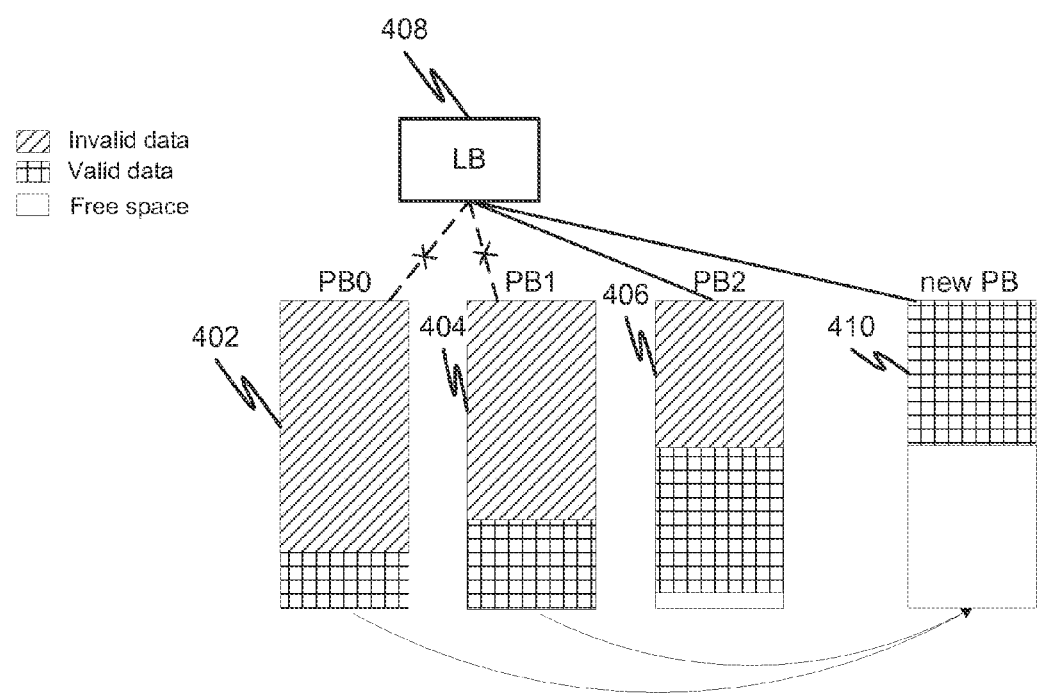
Figure 5:
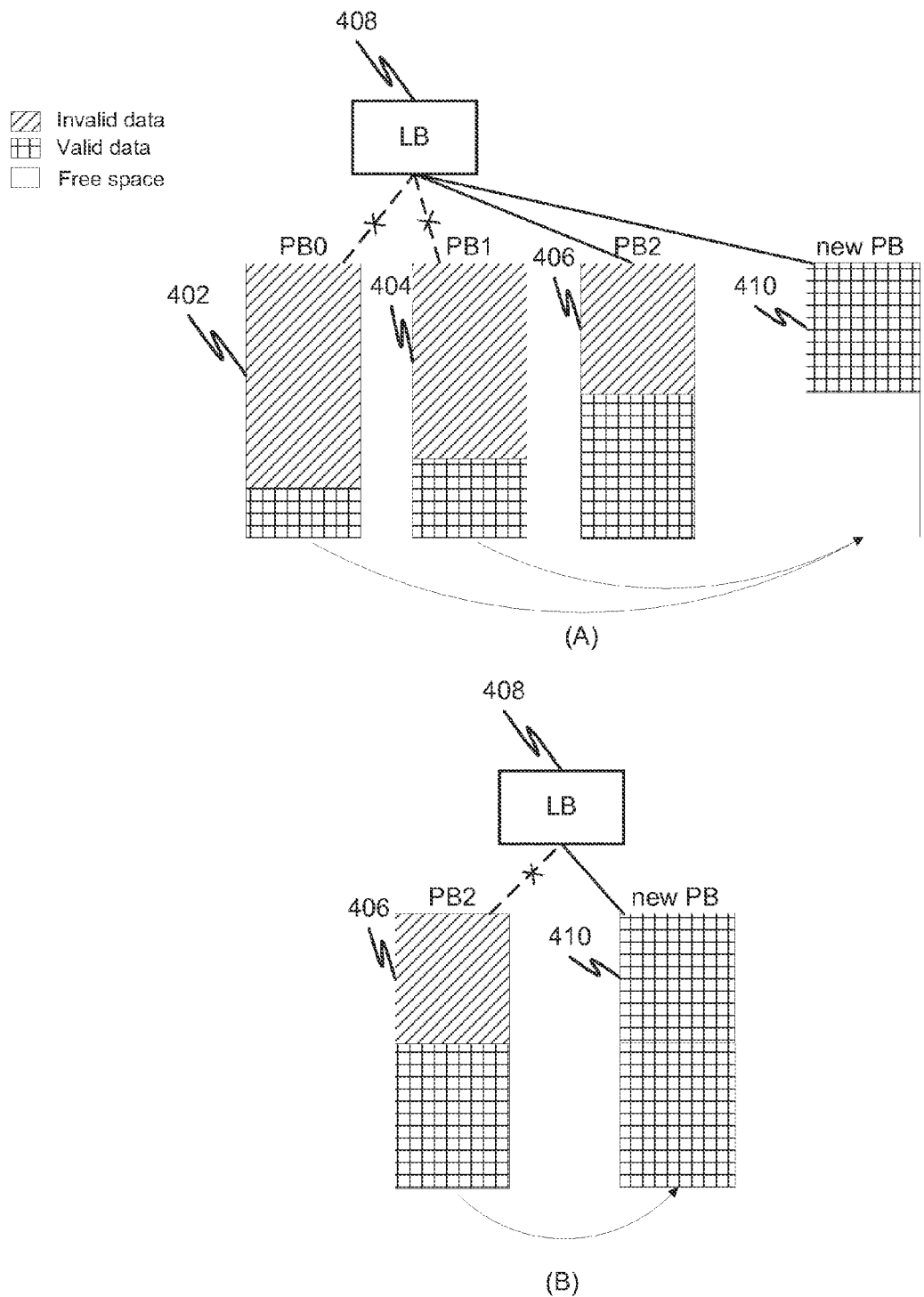

As shown in FIG. 4, three physical blocks 402, 404 and 406 are allocated to a logical block 408 and each include valid data and invalid data. The physical block 402 includes less valid data than the physical blocks 404 and 406. The physical block 406 includes some free space (e.g., pages without data), but the free space is insufficient to accommodate the valid data in the physical block 402. Thus, a new physical block 410 is obtained (e.g., from another logical block). Then, the valid data in the physical block 402 is copied to the physical block 410, and the physical block 402 is released. In order to provide an extra physical block to other logical blocks, the physical block 404 that has the second least amount of valid data (e.g., less valid data than the physical block 406) is selected, and the valid data in the physical block 404 is copied to the physical block 410. Then, the physical block 404 is also released. As such, in exchange for the new physical block 410, the logical block 408 releases two physical blocks to provide an extra physical block to be used by other logical blocks. In some embodiments, the valid data in the physical block 402 and in the physical block 404 is copied to the new physical block 410 sequentially or simultaneously. The physical blocks 402 and 404 are released sequentially or simultaneously.

As shown in FIG. 5(A), three physical blocks 502, 504 and 506 are allocated to a logical block 508 and each includes valid data and invalid data. The physical block 502 includes the least amount of valid data among the physical blocks 502, 504 and 506, and the physical block 504 includes the second least amount of valid data among the physical blocks 502, 504 and 506. A new physical block 510 is obtained (e.g., from other logical blocks). The valid data in the physical block 502 and in the physical block 504 is copied (e.g., sequentially or simultaneously) to the new physical block 510. Then, the physical blocks 502 and 504 are released (e.g., sequentially or simultaneously) from the logical block 508. The new physical block 510 is allocated with the logical block 508.

Subsequently, it is determined whether the garbage collection operations can continue without affecting the normal operations of the memory device (e.g., a flash memory device), e.g., based on inspection of system resources. When the garbage collection operations continue, it is determined whether the free space in the physical block 410 is sufficient to store the valid data of the physical block 506. If the physical block 410 still has sufficient free space, then the valid data in the physical block 506 is copied to the free space in the physical block 410. The physical block 506 is then released. In some embodiments, the logical block 508 includes more than three physical blocks. If the physical block 510 still has free space for other physical blocks, then the garbage collection process can continue as described above.

Figure 6:
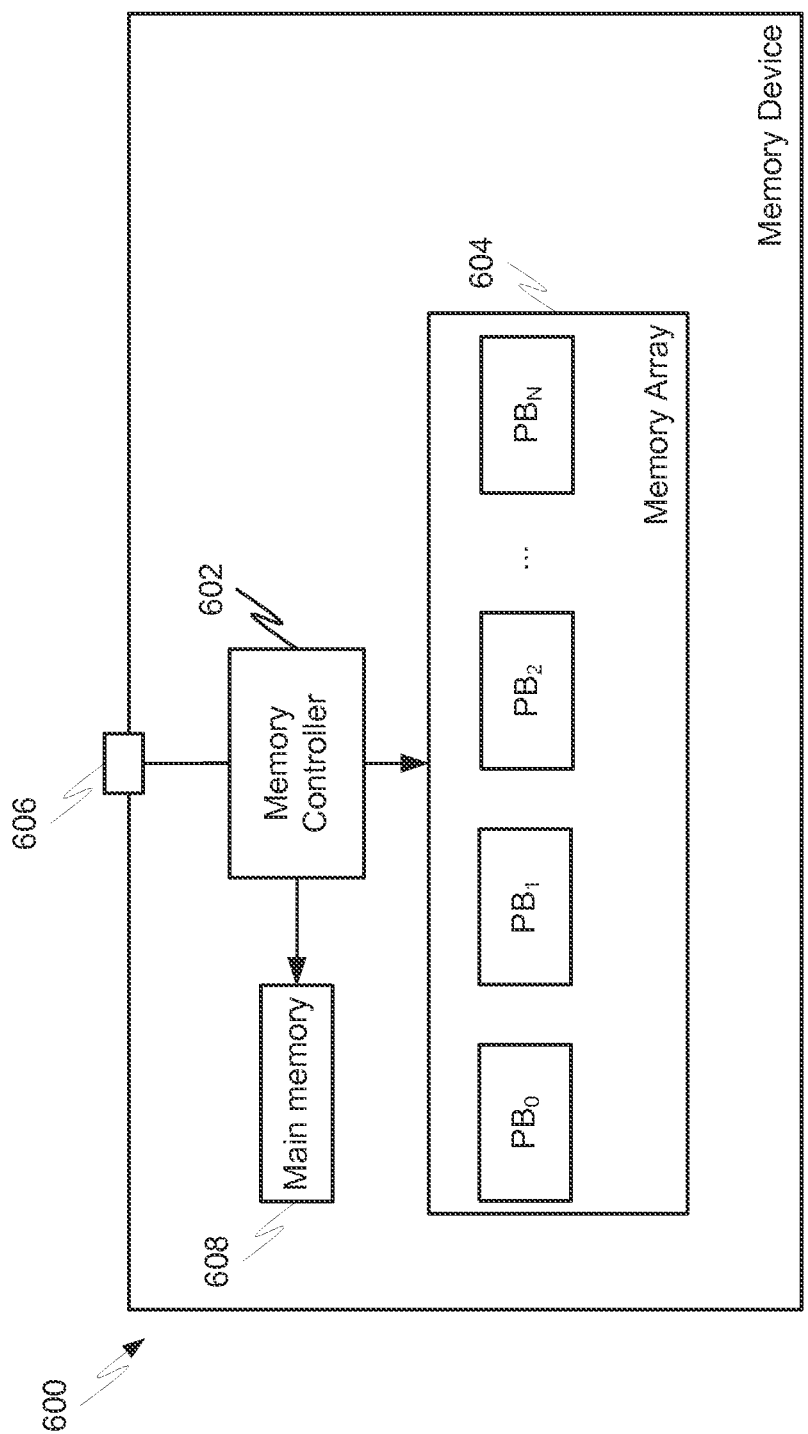
FIG. 6 depicts an example diagram for a memory device.

FIG. 6 depicts an example diagram for a memory device. As shown in FIG. 6, the memory device 600 (e.g., a flash memory device) includes a memory controller 602, a memory array 604, a communication port 606, and a main memory 608. The memory controller 602 is configured to perform garbage collection for the memory device 600, such as active garbage collection and passive garbage collection as described above. The memory array 604 includes multiple physical blocks for storing data. The main memory 608 stores memory management information including a logical-to-physical table for mapping the physical blocks to logical blocks. The communication port 606 is configured to perform data communication with external electronic devices (e.g., a host computer).

Figure 7:
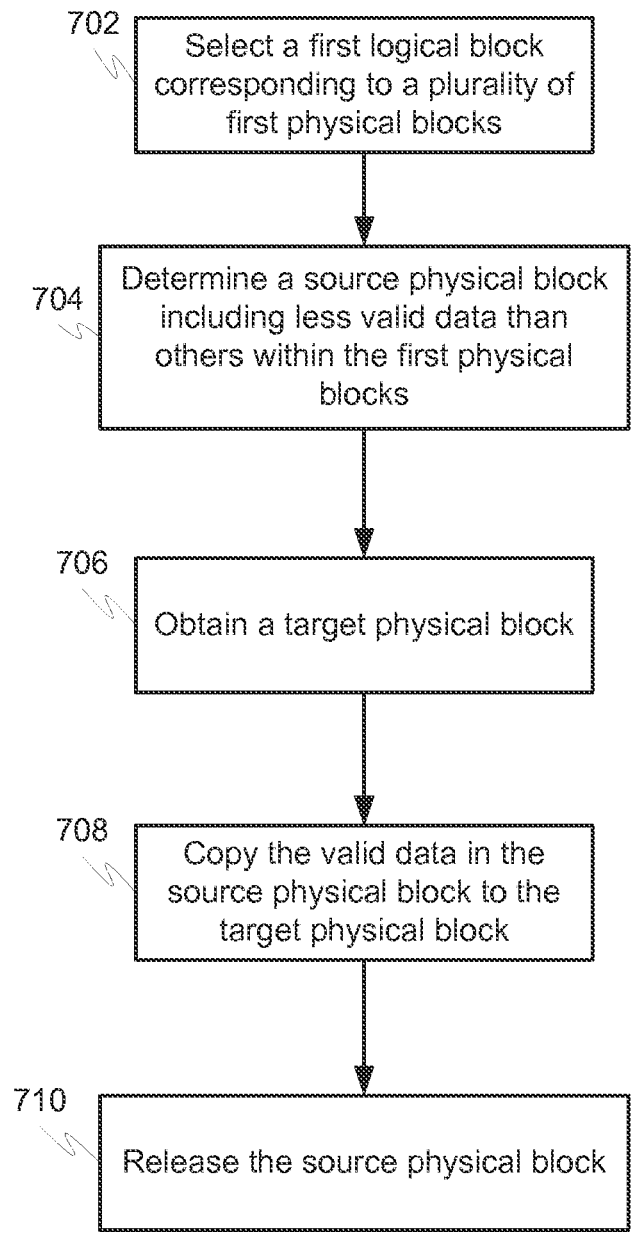
FIG. 7 depicts an example flow diagram for garbage collection in a memory device.

FIG. 7 depicts an example flow diagram for garbage collection in a memory device. At 702, a first logical block corresponding to a plurality of first physical blocks of a memory device is selected. For example, a logical-to-physical table may be used for selecting the first logical block and accessing the corresponding physical blocks. At 704, a source physical block within the first physical blocks is determined, the source physical block including less valid data than one or more second physical blocks within the first physical blocks. For example, the source physical block may include the least amount of valid data among the first physical blocks. At 706, a target physical block of the memory device is obtained. At 708, the valid data in the source physical block is copied to the target physical block. At 710, the source physical block is released for storing new data.

In some embodiments, the target physical block is obtained from another logical block, or obtained as a free physical block that is not linked to any logical block. After the valid data in the source physical block is copied to the target physical block, the target physical block is allocated to the first logical block. The data in the source physical block is erased and then the source physical block may be allocated to another logical block for storing data. Furthermore, a second physical block that includes the second least amount of valid data among the first physical blocks is determined, and the valid data in the second physical block is copied to the target physical block. The second physical block is then released and may be allocated to another logical block. If the target physical block still contains enough free space for valid data in one or more third physical blocks included in the first physical blocks, the valid data in the third physical blocks is copied to the target physical block, and the third physical blocks are released. In certain embodiments, the first physical blocks that are mapped to the first logical block include the target physical block. The target physical block contains sufficient free space to store the valid data in the source physical block, and/or the valid data in others of the first physical blocks.

This written description uses examples to disclose the invention, include the best mode, and also to enable a person skilled in the art to make and use the invention. The patentable scope of the invention may include other examples that occur to those skilled in the art. For example, the systems and methods described herein may be implemented on many different types of processing systems by program code comprising program instructions that are executable by the system processing subsystem. Other implementations may also be used, however, such as firmware or appropriately designed hardware configured to carry out the methods and systems described herein. For example, the systems and methods described herein may be implemented in an independent processing engine, as a coprocessor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A method for data storage management in a memory device, the method comprising:
   selecting a first logical block corresponding to a plurality of first physical blocks of a memory device;
   selecting a first source physical block from among the first physical blocks based on the first source physical block including less valid data than any other physical block of the first physical blocks;
   selecting a target physical block that is of the memory device and not allocated to the first logical block;
   copying the valid data from the first source physical block to the target physical block;
   allocating the target physical block to the first logical block after the copying; and
   releasing the first source physical block to permit the first source physical block to store new data;
   selecting a second source physical block from among the first physical blocks based on the second source physical block including less valid data than any other physical block of the first physical blocks excluding the first source physical block;
   copying the valid data from the second source physical block to the target physical block; and
   releasing the second source physical block to permit the second source physical block to store new data.

2. The method of claim 1, further comprising, after releasing the first source physical block:
   allocating the first source physical block to a second logical block that is of the memory device and is other than the first logical block.

3. The method of claim 1, wherein the target physical block is, during the copying of the valid data from the first source physical block to the target physical block, allocated to a second logical block that is of the memory device and is other than the first logical block.

4. The method of claim 1, further comprising, after releasing the second source physical block:
   allocating the second source physical block to a second logical block that is of the memory device and is other than the first logical block.

5. The method of claim 1, further comprising, before copying the valid data from the first source physical block to the target physical block:
   determining whether the target physical block includes sufficient free space to accommodate the valid data from the first source physical block.

6. A memory device comprising:
   a memory array organized into multiple original physical blocks for storing data; and
   a memory controller configured to:
     select a first logical block corresponding to a plurality of first physical blocks;
     select a first source physical block from among the first physical blocks based on the first source physical block including less valid data than any other physical block of the first physical blocks;
     select a target physical block that is of the memory device and not allocated to the first logical block;
     copy the valid data in the first source physical block to the target physical block;
     allocate the target physical block to the first logical block after the copying; and
     release the first source physical block to permit the first source physical block to store new data;
     selecting a second source physical block from among the first physical blocks, based on the second source physical block including less valid data than any other physical block of the first physical blocks excluding the first source physical block;
     copy the valid data from the second source physical block to the target physical block; and
     release the second source physical block to permit the second source physical block to store new data.

7. The device of claim 6, wherein the memory controller is further configured to, after releasing the first source physical block:
   allocate the first source physical block to a second logical block that is of the memory device and is other than the first logical bock.

8. The device of claim 6, wherein the target physical block is, during the copying of the valid data from the first source physical block to the target physical block, allocated to a second logical block that is of the memory device and is other than the first logical block.

9. The device of claim 6, wherein the memory controller is further configured to:
   allocate the second source physical block to a second logical block that is of the memory device and is other than the first logical block.

10. A system for data storage management in a memory device, the system comprising:
    one or more data processors; and
    a computer-readable memory encoded with programming instructions for commanding the one or more data processors to:
      select a first logical block corresponding to a plurality of first physical blocks of a memory device;
      select a first source physical block from among the first physical blocks based on the first source physical block including less valid data than any other physical block of the first physical blocks;

select a target physical block of the memory device that is not allocated to the first logical block;

copy the valid data in the first source physical block to the target physical block;

allocate the target physical block to the first logical block after the copying; and release the first source physical block to permit the first source physical block to store new data;

selecting a second source physical block from among the first physical blocks based on the second source physical block including less valid data than any other physical block of the first physical blocks excluding the first source physical block;

copy the valid data from the second source physical block to the target physical block; and release the second source physical block to permit the second source physical block to store new data.

11. The system of claim 10, wherein the target physical block is, during the copying of the valid data from the first source physical block to the target physical block, allocated to a second logical block that is of the memory device and is other than the first logical block.

12. The method of claim 1, wherein (i) the copying of the valid data from the first source physical block to the target physical block and (ii) the copying of the valid data from the second source physical block to the target physical block is performed simultaneously.

13. The method of claim 1, wherein the target physical block is, during the copying of the valid data from the first source physical block to the target physical block, not allocated to any logical block.

* * * * *